US 6,697,902 B1

(12) United States Patent
Sugimoto

(10) Patent No.: US 6,697,902 B1
(45) Date of Patent: Feb. 24, 2004

(54) DATA STORAGE DEVICE AND INTERFACE DEVICE FOR THE DATA STORAGE DEVICE

(75) Inventor: Kinichi Sugimoto, Tokyo (JP)

(73) Assignee: NEC Corporation (JP)

( * ) Notice: Subject to any disclaimer, the term of this patent is extended or adjusted under 35 U.S.C. 154(b) by 456 days.

(21) Appl. No.: 09/703,761

(22) Filed: Nov. 1, 2000

(30) Foreign Application Priority Data

Nov. 2, 1999 (JP) .......................................... 11-312299

(51) Int. Cl.[7] .............................................. G06F 13/00
(52) U.S. Cl. ..................................................... 710/305
(58) Field of Search ........................... 710/107–119, 305

(56) References Cited

U.S. PATENT DOCUMENTS 5,377,051 A * 12/1994 Lane et al. .................... 386/81
5,659,654 A * 8/1997 Nagasawa et al. .......... 386/120

FOREIGN PATENT DOCUMENTS

EP 0880136 A2 * 11/1998
JP 10-320913 12/1998 ........... G11B/20/10

* cited by examiner

Primary Examiner—Paul R. Myers
(74) Attorney, Agent, or Firm—Hayes Soloway P.C.

(57) ABSTRACT

A data storage device is provided which stores audio/video data to a disk media with a small amount of buffer memory and improves response with a reduced cost. Data transmission timing is known from a DMA request signal (DREQ) and a DMA acknowledgement signal (DACK). Therefore, audio/video data from an encoder can be directly supplied to an interface device without being temporarily stored in a buffer memory located before the interface device.

12 Claims, 13 Drawing Sheets

CONTIGUOUS AREA STRUCTURE

| DATA LENGTH | DATA NAME | CONTENTS |
|---|---|---|
| 4 | LENGTH OF AREA | PHYSICAL SECTOR NUMBER OF AREA |
| 4 | ADDRESS OF AREA | PHYSICAL SECTOR ADDRESS OF AREA |

FIG.10

FILE ENTRY FORMAT

| DATA LENGTH | DATA NAME | CONTENTS |
|---|---|---|
| — | — | — |
| 4 | ATTRIBUTE | ATTRIBUTE OF FILE<br><br>BIT 0 : DIRECTORY / FILE BIT<br><br>BIT 1 : STREAM BIT |
| 4 | FILE LENGTH | LENGTH OF FILE |
| 16 | FILE NAME | NAME FOR IDENTIFYING FILE |
| — | — | — |
| 4 | THE NUMBER OF CONTIGUOUS AREA STRUCTURE | |
| L_AD * 8 | CONTIGUOUS AREA STRUCTURE (S) | MAPPING OF CONTIGUOUS AREA STRUCTURE |
| — | — | — |

FIG.11

DIRECTORY ENTRY FORMAT

| DATA LENGTH | DATA NAME | CONTENTS |
|---|---|---|
| — | — | — |
| 4 | ATTRIBUTE | ATTRIBUTE OF DIRECTORY<br>BIT 0 : DIRECTORY / FILE BIT<br>BIT 1 : STREAM BIT |
| 4 | FILE LENGTH | LENGTH OF DIRECTORY ENTRY |
| 16 | DIRECTORY NAME | NAME FOR IDENTIFYING DIRECTORY |
| — | — | — |
| 4 | THE NUMBER OF FILE ENTRIES (=L_FE) | |
| L_FE * 256 | FILE ENTRY | MAPPING OF FILE ENTRY |
| — | — | — |

FIG.12

EMPTY AREA FILE FORMAT

| DATA LENGTH | DATA NAME | CONTENTS |
|---|---|---|
| — | — | — |
| 4 | THE NUMBER OF CONTIGUOUS AREA STRUCTURE (=L_AD) | |
| L_AD * 8 | CONTIGUOUS AREA STRUCTURE (S) | MAPPING OF CONTIGUOUS AREA STRUCTURE |
| — | — | — |

FIG.13

ABNORMAL AREA FORMAT

| DATA LENGTH | DATA NAME | CONTENTS |
|---|---|---|
| — | — | — |
| 4 | THE NUMBER OF CONTIGUOUS AREA STRUCTURE (=L_AD) | |
| L_AD * 8 | CONTIGUOUS AREA STRUCTURE (S) | MAPPING OF CONTIGUOUS AREA STRUCTURE |
| — | — | — |

FIG.14

DATA STORAGE DEVICE AND INTERFACE DEVICE FOR THE DATA STORAGE DEVICE

BACKGROUND OF THE INVENTION

1. Field of the Invention

The invention relates to a data storage device and, in particular, to a data storage device including an interface which is capable of storing a large amount of data such as audio/video data and an interface device used for the data storage device.

2. Description of the Related Art

In the prior art, when audio/video data including image data are stored by using a disk media such as a hard disk, for an effective configuration for storing, real-time consecutive code data generated in encoding audio/video data is required without exception since a the speed of writing data to the disk media is lower than a the speed of inputting the audio/video data.

Specifically, a sequence of thus generated code data is temporarily stored in a high speed buffer memory. Furthermore, also using another buffer memory in a disk device makes it possible to avoid "buffer underrun".

For example, a device is disclosed in Japanese Laid-Open Publication No. H10-320913 (namely, 320913/1998) as a type of the above prior data storage device.

However, in the above prior data storage device, it is required to prepare a large amount of buffer memory since the buffer memory is loaded with audio/video data encoded. For example, if the encoded data are received by an FIFO memory as the buffer memory, the FIFO memory must have a very large memory capacity. At any rate, the cost to process the audio/video data may be increased due to the large amount of memory.

That is, since the audio/video data are given in real-time and stored in the disk media having low data writing speed, a hardware configuration is required to temporarily keep the audio/video data.

Also, in the prior data storage device, it is difficult for an application, such as a file system performing area management, to perform area management without using a buffer memory.

This is because data should be maintained for a predetermined time not to eliminate the data immediately after writing of the data. For example, the data may be used to rewrite the data into the data storage device when an error occurs in write operation.

SUMMERY OF THE INVENTION

Therefore, it is an object of the invention to provide a data storage device which is capable of reducing a cost of the device and developing operation response by eliminating unnecessary buffer memory.

It is also an object of the invention to provide an interface to which a general-purpose area management software can be used even if a buffer memory is deleted.

According to a first aspect of the invention, there in provided a data storage device which comprises a read/write device which writes data to a data storage media and reads the data from the data storage media, an interface device which controls the read/write device for data input/output, and a buffer memory which is controlled by the interface device. Herein, the interface device comprises a memory control device which activates a request signal which requests to transmit the data, receives the data on a data bus when the request signal is activated and an acknowledgement signal is responded to the request signal, stores the data to the buffer memory, and reads the data from the buffer memory and transmits the data to the read/write device, and an operation control device which receives an instruction command from outside, and instructs the memory control device to activate or inactivate the request signal and instructs the memory control device to transmit the data to the read/write device in response to the instruction command.

According to a second aspect of the invention, there is provided an interface device which controls input/output of data to a read/write device reading or writing data to a data storage media. Herein, the interface device comprises a memory control device which activates a request signal which requests to transmit the data, receives the data on a data bus when the request signal is activated and an acknowledgement signal is responded to the request signal, stores the data to the buffer memory, and reads the data from the buffer memory and transmits the data to the read/write device, and an operation control device which receives an instruction command from outside, and instructs the memory control device to activate or inactivate the request signal and instructs the memory control device to transmit the data to the read/write device in response to the instruction command.

According to a third aspect of the invention, there is provided a method of storing data in a data storage device including a read/write device which writes data to a data storage media and reads the data from the data storage media. The method comprises the steps of controlling the read/write device for data input/output, controlling a buffer memory, activating a request signal which requests to transmit the data, receiving the data on a data bus when the request signal is activated and an acknowledgement signal is responded to the request signal, storing the data to the buffer memory, reading the data from the buffer memory and transmitting the data to the read/write device, receiving an instruction command from outside, and instructing to activate or inactivate the request signal and instructing to transmit the data to the read/write device in response to the instruction command.

According to a fourth aspect of the invention, there is provided a recording medium readable by a computer, tangibly embodying a program of instructions executable by the computer to perform a method of storing data in a data storage device including a read/write device which writes data to a data storage media and reads the data from the data storage media. The method comprises the steps of controlling the read/write device for data input/output, controlling a buffer memory, activating a request signal which requests to transmit the data, receiving the data on a data bus when the request signal is activated and an acknowledgement signal is responded to the request signal, storing the data to the buffer memory, reading the data from the buffer memory and transmitting the data to the read/write device, receiving an instruction command from outside, and instructing to activate or inactivate the request signal and instructing to transmit the data to the read/write device in response to the instruction command.

BRIEF DESCRIPTION OF TIME DRAWINGS

FIG. 10 shows a diagram representing a configuration for management of a file system of the invention and a configuration of a contiguous area structure;

FIG. 11 shows a diagram representing a configuration for management of a file system of the invention and a file entry format:

FIG. 12 shows a diagram representing a configuration for management of a file system of the invention and a directory entry format;

FIG. 13 shows a diagram representing a configuration for management of a file system of the invention and an empty area entry format;

FIG. 14 shows a diagram representing a configuration for management of a file system of the invention and an abnormal entry format;

DESCRIPTION OF THE PREFERRED EMBODIMENT

Figure 1:
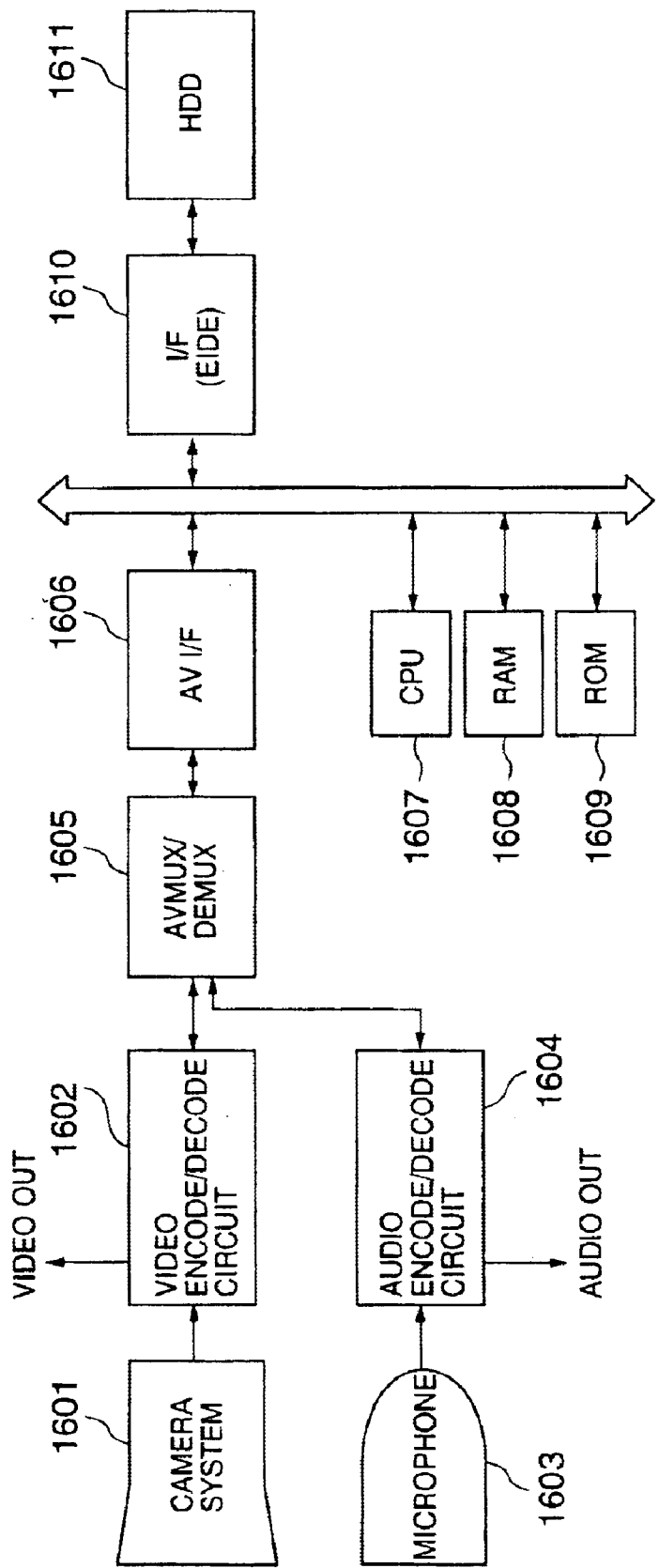
FIG. 1 shows a block diagram representing an audio/video data storage device including a prior data storage device.

At first, illustration is made about the above described prior data storage device disclosed in Japanese Laid Open Publication (JP-A) No. H10-320913 with reference to FIG. 1.

In FIG. 1, the conventional data storage device, data signals are firstly encoded by a video encode/decode circuit 1602 and an audio encode/decode circuit 1604. Then, the data signals are multiplexed by an AV multiplexer/demultiplexer 1605 and are supplied to an AV interface 1606.

The data signals are further sent to an interface 1610 and then written into a hard disk drive (HDD) 1611.

A buffer memory is located in the hard disk drive 1611 and the data signals are temporarily stored in the buffer memory. In general, the memory capacity of the buffer needs to be large to compensate delay time caused on receiving real-time audio/video data stream or on seeking the alternate sector when a write error happens.

Figure 2:
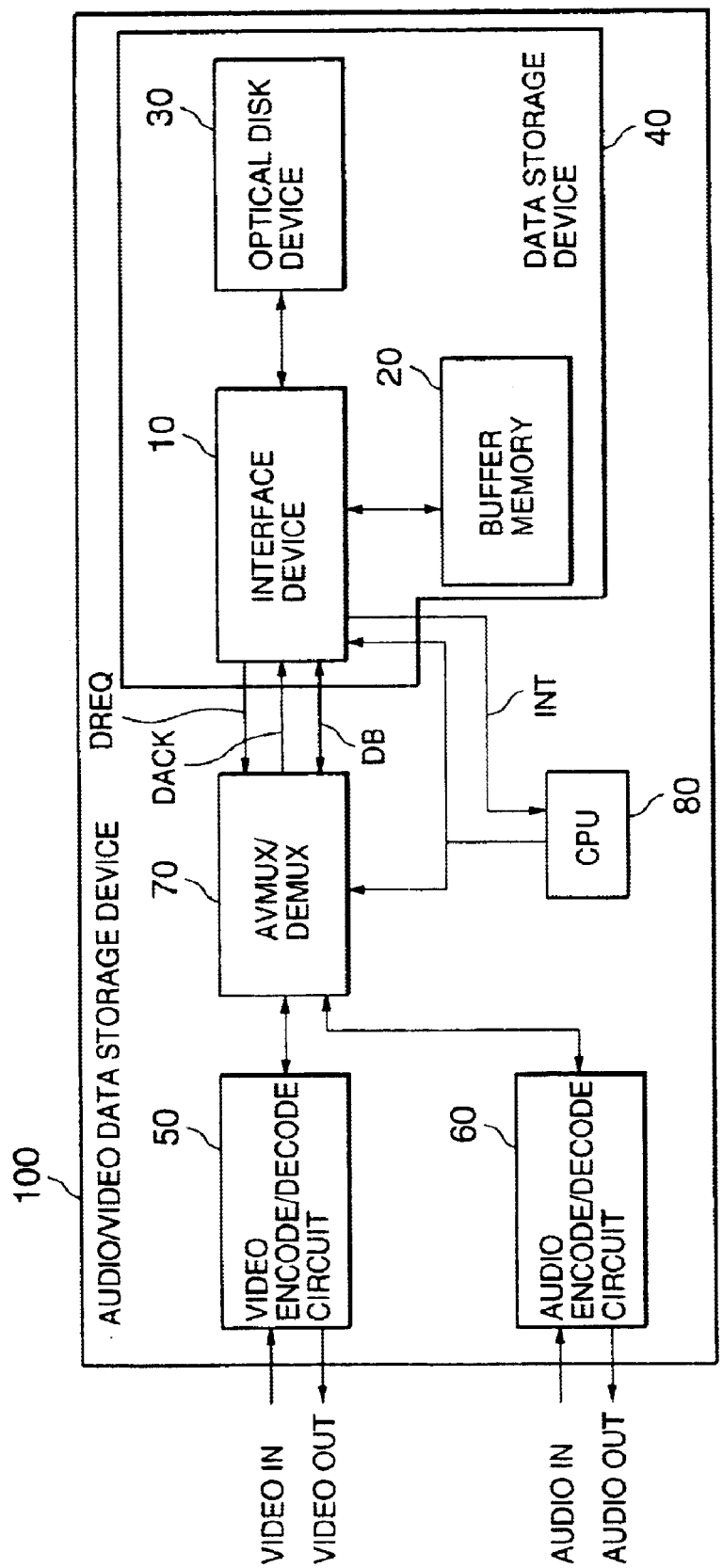
FIG. 2 shows a block diagram representing an audio/video data storage device including a data storage device according to an embodiment of the invention.

Next, description is made about a data storage device according to an embodiment of the invention with reference to FIG. 2.

In FIG. 2, the data storage device 40 of the invention includes an optical disk device 30 using an optical disk as a storage media, an interface device 10, and a buffer memory 20. As shown in FIG. 2, the data storage device 40 is included in an audio/video storage device 100 for storing audio/video data. Hereinafter, the words "audio/video data" is used to denote data including audio data and/or video data. The illustrated audio/video data storage device 100 includes a video encode/decode circuit 50 which inputs/outputs video signals, an audio encode/decode circuit 60 which inputs/outputs audio signals, an AV MUX/DEMUX (multiplexer/demultiplexer) 70 which multiplexes encoded video signals and encoded audio signals, and a CPU 80 which controls operation of the AV MUX/DEMUX 70 and the data storage device 40.

In this example, the video encode/decode circuit 50 encodes or decodes using MPEG (Moving Picture Experts Group) method such as MPEG1, MPEG2, or MPEG4, but other encode/decode method may be used. Also, the audio encode/decode circuit 60 encodes or decodes using, for example, MPEG audio, but similarly to the video encode/decode circuit 50, other method may be used.

The CPU S0 instructs the AV MUX/DEMUX 70 to start/stop operation of encode/encode of the data and issues a write command to the interface device 10 so as to write data stored in the buffer memory 20 which is used as a data buffer and to thereafter store the data into a specified address in the optical disk. Also, the CPU 80 issues a read command to the interface device 10 so as to read data which are written in a specified address in the optical disk.

In the audio/video data storage device 100, the video signals are supplied to the video encode/decode circuit 50 and then encoded (compressed). Likewise, the audio signals are supplied to the audio encode/decode circuit 60 and then encoded. Both of the encoded video signals and the encoded audio signals are transferred to the AV MUX/DEMUX 70. The encoded video and audio signals are multiplexed in the AV MUX/DEMUX 70 and transferred to the interface device 10 of the data storage device as a single audio/video data stream.

Transmission between the AV MUX/DEMUX 70 and the interface device 10 is performed as follows. That is, the CPU 80 sends a transmission start command to the interface device 10 and the interface device 10 which receives the command turns a DMA request signal (DREQ) active until a transmission stop command is received or the buffer memory 20 becomes full. The AV MUX/DEMUX 70 sends a DMA acknowledgement signal (DACK) in response to the DMA request signal (DREQ) while the DMA request signal (DREQ) is active. Thus, transmission can be carried out.

On the other hand, when the data read out from the data storage device 40 are supplied as video signals or audio signals, an audio/video data stream which is read out from the optical disk is firstly sent to the AV MUX/DEMUX 70 from the interface device 10. Then, the stream is divided into video data and audio data, and the video data are sent to the video encode/decode circuit 50 and the audio data are sent to the audio encode/decode circuit 60. Next, the video data are decoded (expanded) by the video encode/decode circuit 50 and the audio data are decoded (expanded) by the audio encode/decode circuit 60.

Figure 3:
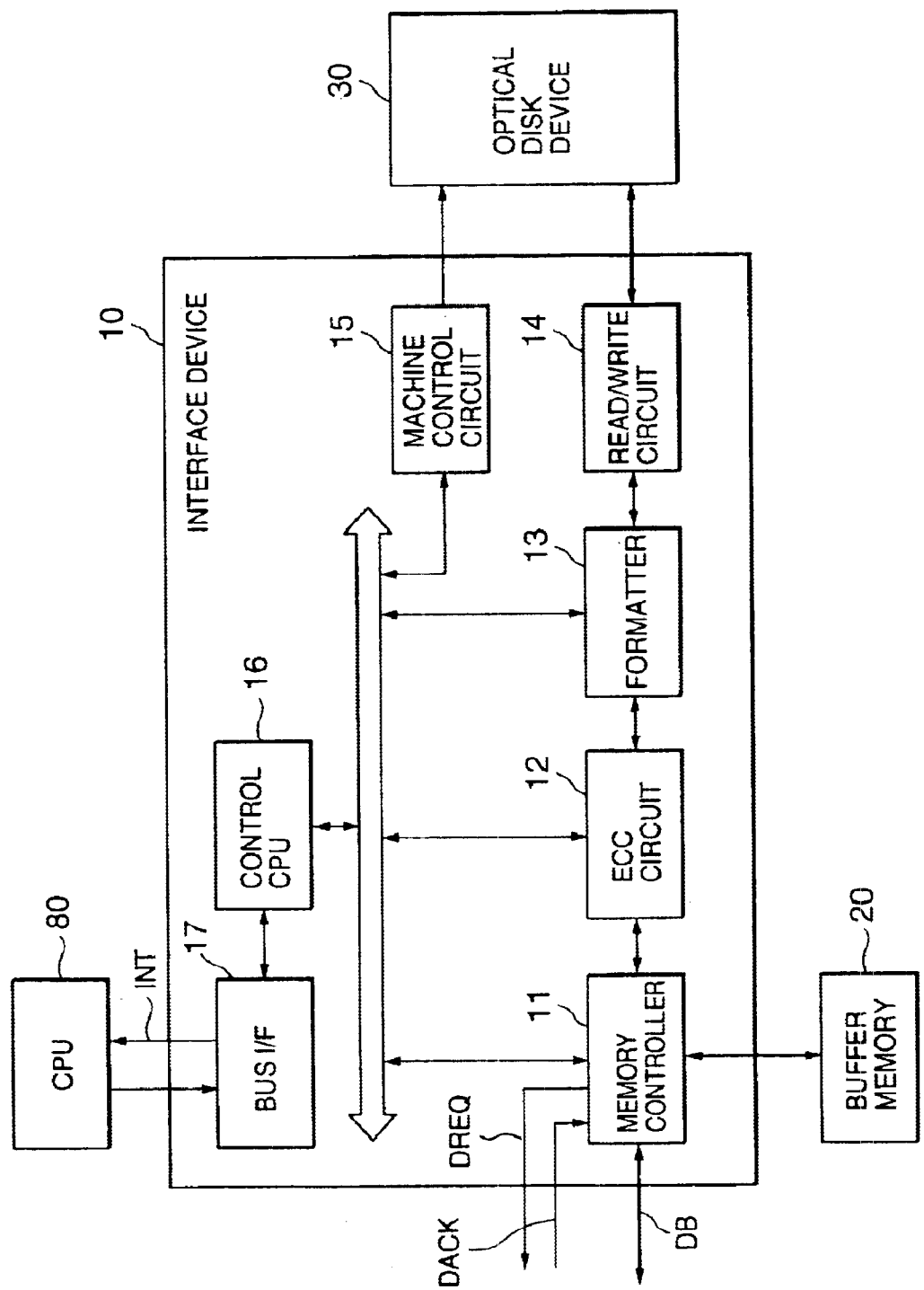
FIG. 3 shows a block diagram representing an interface device according to an embodiment of the invention.

In FIG. 3, the interface device 10 of the data storage device 40 is shown in more detail. The interface device 10 according to the embodiment of the invention includes a memory controller 11, an ECC (Error Correction Code) circuit 12, a formatter 13, and a read/write circuit 14. The memory controller 11 receives data of the audio/video data stream transmitted from the AV MUX/DEMUX 70 and transmits the data to the optical disk 30 after a predetermined operation. Also, the memory controller 11 receives data from the optical disk device 30 and transits the data to the AV MUX/DEMUX 70 after a predefined operation.

The interface device 10 further includes a machine control circuit 15 which controls operation of the optical disk device 30, a control CPU 16 which controls the above elements, and a bus interface (bug I/F) 17 which is connected between the control CPU 16 and the CPU 80.

The control CPU 16 can receive a command from the CPU 80 through the bus interface 17. And the control CPU 16 controls each element of the interface device 10 according to the received command. Also, the control CPU 16, as required, can issue interrupt (command) to the CPU 80 which resides in higher level than that of the control CPU 16, through the bus interface 17. When the CPU 80 of the higher level receives the interrupt from the control CPU 16, a various of notifications can be received by checking a reason of the interrupt.

The memory controller 11 is operated, under control of the control CPU 16, to make the DMA request signal (DREQ) active or inactive. And when the memory controller 11 receives the DMA acknowledgement signal (DACK) from the AV MUX/DEMUX 70 while the memory controller 11 produces (activates) the DMA request signal (DREQ), the memory controller 11 immediately receives the data on the data bus (DB) and stores the data to the buffer memory 20.

Also, the memory controller 11 can send, under control of the control CPU 16, the data on the buffer memory 20 to the data bus (DB) or the ECC circuit 12. The direction of transmission of the data (the data loaded from the buffer memory 20 are transmitted to the data bus (DB) or the ECC circuit 12) and an address of the data on the bufer memory 20 are controlled by the control CPU 16.

The ECC circuit 12 adds error correction code to the data received from the memory controller 11 and sends the data to the formatter 13. Also, the ECC circuit 12 performs error correction about the data received from the formatter 13 and sends the data to the memory controller 11.

The formatter 13 transforms the data received from the ECC circuit 12 into sector format and sends the data to the read/write circuit 14. Also, the formatter 13 divides the data received from the read/write circuit 14 for each sector and sends the divided data to the ECC circuit 12.

The read/write circuit 14 and the machine control circuit 15 cooperate to manipulate the optical disk device 30 and to read or write the data. Herein, the machine control circuit 15 manipulates such as a head of the optical disk device 30 and controls mechanical operation such as seek operation to a desired address position of the optical disk. The read/write circuit 14 reads the data from an object address position of the optical disk or writes the data to the position.

Therefore, when the control CPU 16 is operated to write the data stored in the buffer memory 20 to the optical disk, the data loaded from the buffer memory 20 are sent from the memory controller 11 to the ECC circuit 12 and then error correction codes are added to the data. Thereafter, the data are transformed into sector format by the formatter 13 and are written into the optical disk by the read/write circuit 14.

On the other hand, when the control CPU 16 is operated to read the data from the optical disk, the data read from the optical disk are divided by the formatter 13 through the read/write circuit 14, and the ECC circuit 12 performs error correction about the data. After that, the data are stored in the buffer memory 20 through the memory controller 11.

The buffer memory 20 of the data storage device 40 can be structured by high speed semiconductor memories such as an SRAM. Also, in the embodiment of the invention, the optical disk device 30 using an optical disk is illustrated as a data storage media, but the method of the invention can apply to a magnetic disk device using a magnetic disk such as a hard disk or other storage device using slow response media such as a tape media.

Next, description is made about operation of the memory controller 11 and the buffer memory 20. The memory controller 11 manages the buffer memory 20 as a file management buffer for managing a file and an audio/video data management buffer for managing audio/video data. The audio/video data management buffer is controlled by FIFO access method. Also, the audio/video data management buffer may be managed in every one of bank units or in every one of byte units. Herein, the audio/video data management buffer is assumed to be managed in every bank unit in FIG. 4, while the audio/video data management buffer is assumed to be managed in every byte unit in FIG. 5.

Figure 4:
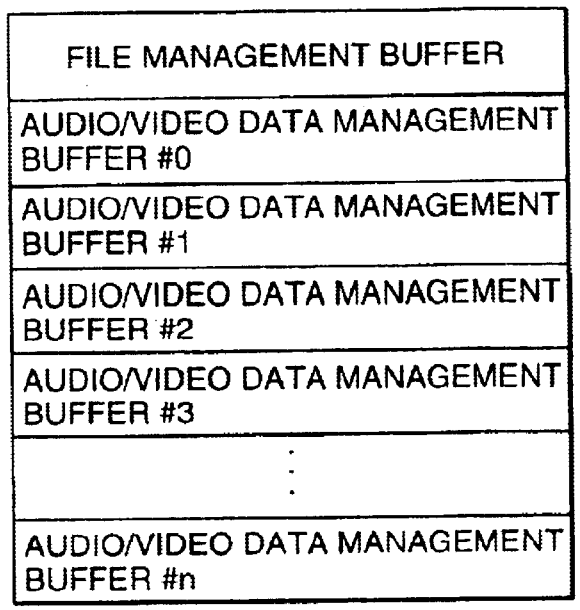
FIG. 4 shows a diagram representing a method of managing a file for each bank.

In FIG. 4, the memory controller 11 is operable in response the DMA request signal (DREQ) and the DMA acknowledgement signal (DACK) which are DMA control signals for the interface device 10. As a result, the memory controller 11 manages a location (address) of the buffer memory 20, at which the data transmitted via the data bus (DB) are to be read or written.

The control CPU 16 can control and use areas (banks) in the audio/video data management buffer #0 to #n as sequential ring buffer by designating banks in the audio/video data management memory. The control CPU 16 further manages used banks and unused banks, and notifies, as required, the CPU 80 of an amount of the stored data. Since the control CPU 16 controls an amount of transmitted data or transmission timing of the data, the memory controller 11 should be operable as the DMA controller or have a function which corresponds to the DMA controller.

Figure 5:
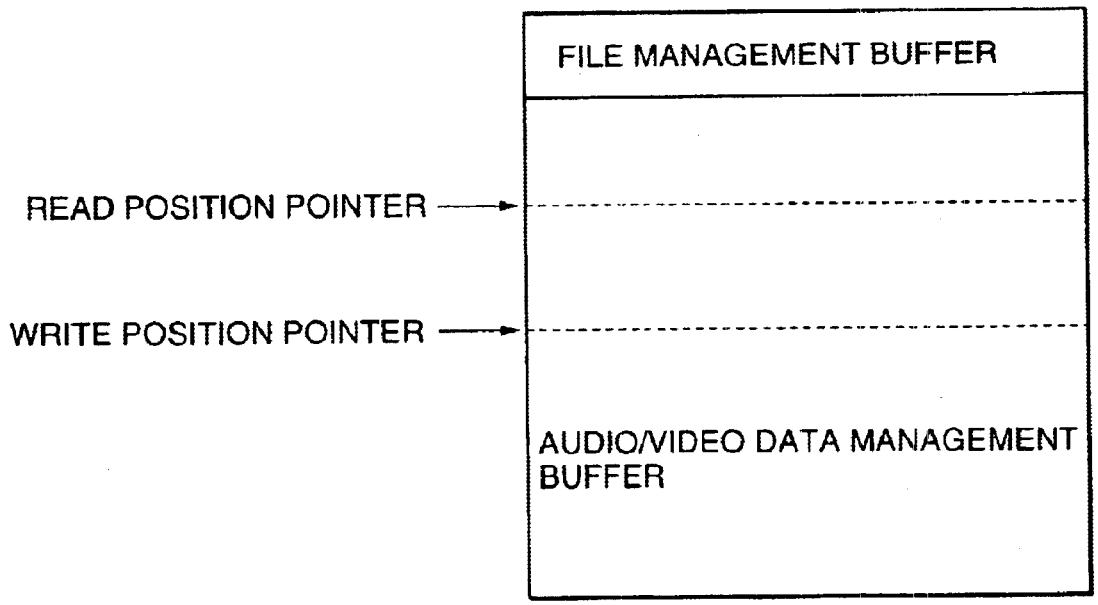
FIG. 5 shows a diagram representing a method of managing a file for each byte.

Next, in FIG. 5, the memory controller 11 is operable like in FIG. 4 in response to the DMA request signal (DREQ) and the DMA acknowledgement signal (DACK). Thus, the memory controller 11 manages a location (address) of the buffer memory 20, at which the data transmitted via the data bus (DB) are to be read or written.

The control CPU 16 manages the data stored in the buffer memory 20 by managing addresses given in the form of read position pointer or write position pointer. The addresses are used in ascending order. When either the read position pointer or the write position pointer arrives at the last position of the audio/video data management buffer, the pointer should be moved to the top of the buffer and an address is cyclically assigned to the read position pointer or the write position pointer from the address of the top of the buffer. Also, the read position pointer never surpasses the write position pointer. The control CPU 16 further monitors the number of the data by referring to the read position pointer and the write position pointer, and a notifies, as required, the CPU 80 of the number.

Also, the memory controller 11 writes or reads the data designated by the control CPU 16, at a voluntary address in the buffer memory 20. Subsequently, the CPU 80 which resides outside of the interface device 10 can read or write the data at a voluntary address in the buffer memory 20.

Figure 6:
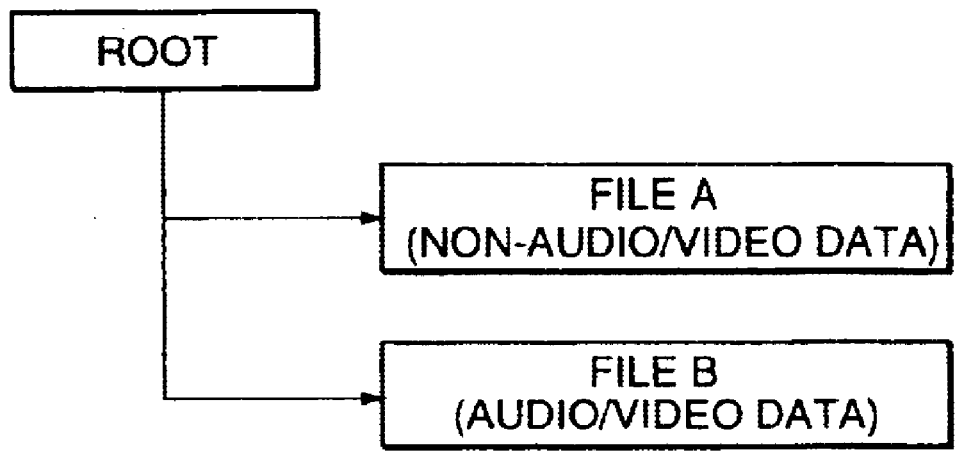
FIG. 6 shows a diagram representing an example of configuration of a data file for writing of an embodiment of the invention.

Next, description is made about operation of the embodiment of the invention with reference to FIG. 6. In FIG. 6, a file A includes data other than audio/video data, for example, and includes data to handle management data or audio/video data. A file B includes audio/video data.

Figure 7:
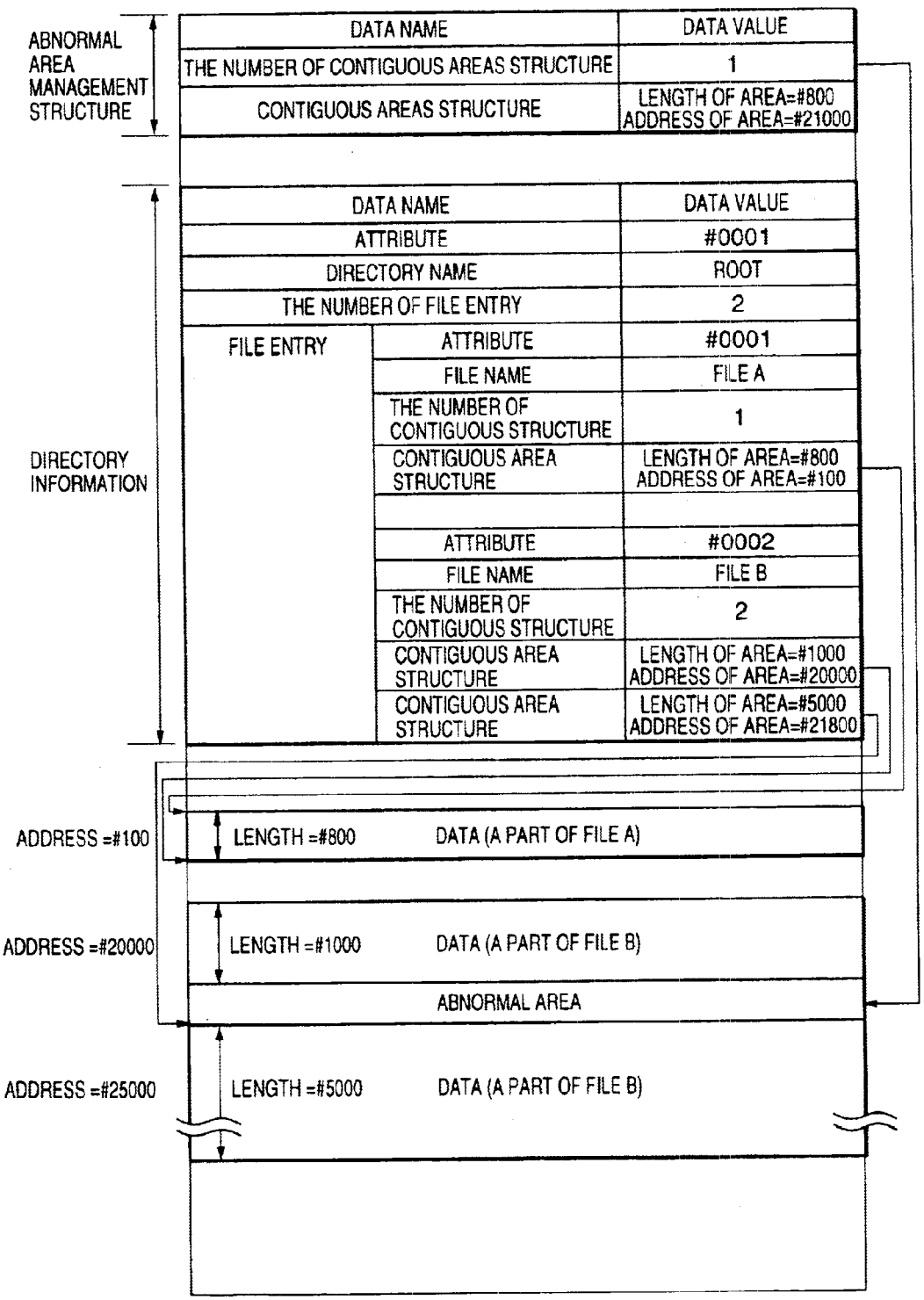
FIG. 7 shows a diagram representing an example of mapping of data of a disk when a file system of the invention applies to the configuration of FIG. 6.

In this example, it is assumed that a file system as shown in FIGS. 10 to 14 is used, as will become clear later. In FIG. 7, is shown an example of data mapping on the optical disk when the above file system is applied to the file structure of FIG. 6. Also, in FIG. 7, the number followed by "#" denotes a hexadecimal number.

In this file system, a characteristic of file is expressed by attribute flags, but the method of the embodiment of the invention can apply to other file systems such as a file system having no attribute flag, by managing a method of naming of files by an application. That is, the method of the invention can also apply to a general-purpose file system for a conventional computer.

At first, description is made about mount operation of the file system. The file system which operates on the CPU 80 as control software accesses an empty area entry (shown in FIG. 13), an abnormal area entry (shown in FIG. 14), and a ROOT directory entry (shown in FIG. 12) on the optical disk device 30 and reads management data. As a result, a read command is issued to the interface device 10 to store the management data to the file management buffer in the buffer memory 20. The CPU 80 may decode or copy the data stored in the file management buffer into the RAM in the CPU if required. In this specification, it is to be noted that the "mount operation" is defined by interpreting structure of the received data and by putting a file into a readable or a writable state.

Next, description is made about unmount operation of the file system. The file system writes only updated information in the management data included in an empty area entry (shown in FIG. 13), an abnormal area entry (shown in FIG. 14), and ROOT directory entry (shown in FIG. 12), into the file management buffer in the buffer memory 20. In addition, the file system further issues a write command to the interface device 10 so as to write back the written data to the predetermined address on the optical disk.

In this specification, it is to be noted that the "unmount operation" is defined by writing a state of a table used to read or write the file into a specific area in the optical disk and by synchronizing mapping information of the data and the management data to prepare to eject the optical disk.

Figure 8:
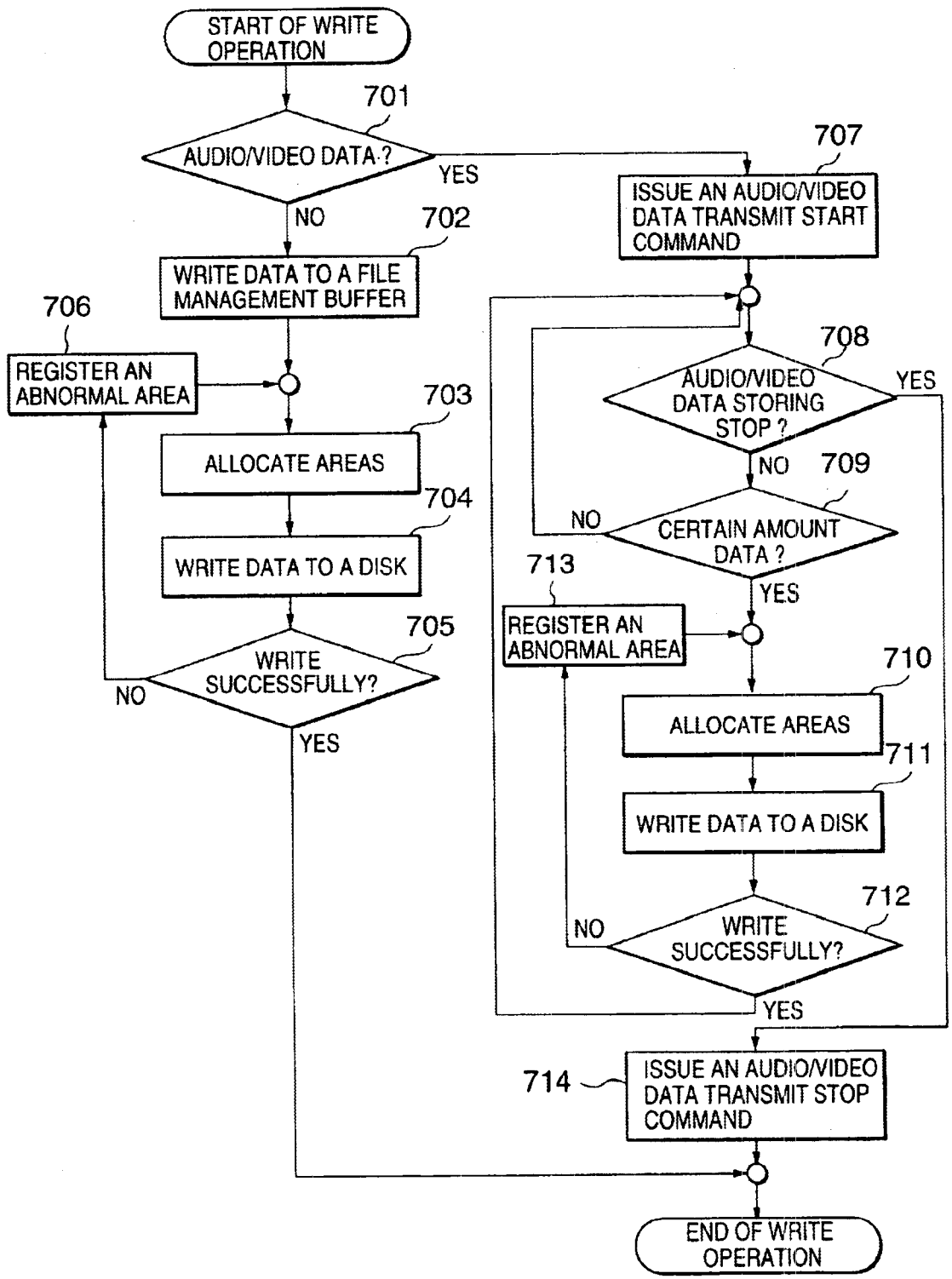
FIG. 8 shows a flowchart of file write operation of an embodiment of the invention.

Next, description is made about file write operation with reference to FIG. 8. After the above-mentioned mount operation of the file system, write operation is performed. At first, it is determined whether the data to be written is audio/video data or not (step 701). This is determined based on an attribute which is given from a host application when write operation is started. In general, the attribute is shown by information corresponding to an attribute in a file entry format shown in FIG. 11. In an example shown in FIG. 11, when a stream bit in the attribute is set to a bit 1, the file is determined as including audio/video data, otherwise the file is determined as including data other than the audio/video data. Also, even if the method of the embodiment of the invention can apply to a file system having no such an attribute about file structure, it is possible to determine whether the file includes audio/video data or hot based on the other characteristic such as a file name.

When the file does not include audio/video data (step 701 (no)), the file system writes the data to the file management buffer area in the buffer memory 20 (step 702). Then, an area is allocated in empty area entries (step 703) and the CPU 80 issues a write command so as to write the data into the allocated area (step 704). The area allocating operation is performed by picking up unused contiguous areas from the empty area entries and adding entries of the contiguous areas to file entries shown in FIG. 11.

After write operation of the data, result of the write operation is determined (step 705). If the write operation is performed successfully, the data stored in the file management buffer are deleted and writing of file is completed. If the write operation is failed, the data stored in the file management buffer are kept intact and an area to be written by the failed write operation is registered as an abnormal area (step 706), and then the write operation is performed again to store the data to another area.

If it is determined that the received data are audio/video data (step 701(yes)), the file system issues an audio/video data transmission start command (step 707). The control CPU 16 of the interface device 10 which receives the audio/video data transmission start command instructs the memory controller 11 to make the DMA request signal (DREQ) active. The file system checks whether an audio/video recording stop instruction is issued or not (step 708). If the file system receives the audio/video recording stop instruction, the system issues an audio/video data transmission stop command (step 714) and the write operation is completed.

If the file system does not receive the audio/video recording stop instruction, the system inquires an amount of the data from the interface device 10, and polling is performed until the amount of the data exceeds a predetermined amount (step 709). When the predetermined amount of data are accumulated (step 709(yes)), some areas are kept or allocated in the empty entries (step 710) and the CPU 80 issues a write command so as to write the data into the allocated areas (step 711).

Next, a result of the write operation is determined (step 712). If the write operation is performed successfully (step 712(yes)), the steps following the step 708 are repeated. On the other hand, if the write operation is failed (step 712(no)), the data stored in the a audio/video data management buffer are kept and an area to be written by the failed write operation is registered as an abnormal area (step 713), and then the write operation is performed again to store the data to another area.

When it is determined in step 709 that an audio/video recording stop instruction is issued, an audio/video data transmission stop command is issued in step 714 and write operation is ended.

Information of an area allocated at the write operation and information of the abnormal areas are each reflected to a directory entry, an abnormal area entry, and an empty area entry. But each of the information is not stored on the disk until the unmount operation is performed.

Referring to FIG. 7 again, an example of mapping is shown when the non-audio/video file A and the audio/video file B are written into an optical disk by the above-mentioned write operation. Herein, an error occurs at an area which starts from the address #21000 and has length of #800, when the file B is recorded, and therefore, the area is registered to the abnormal area entry.

Also, in FIG. 7, the empty area entry is emitted but the entry may be stored at a specified address in a similar manner to the abnormal area entry.

Figure 9:
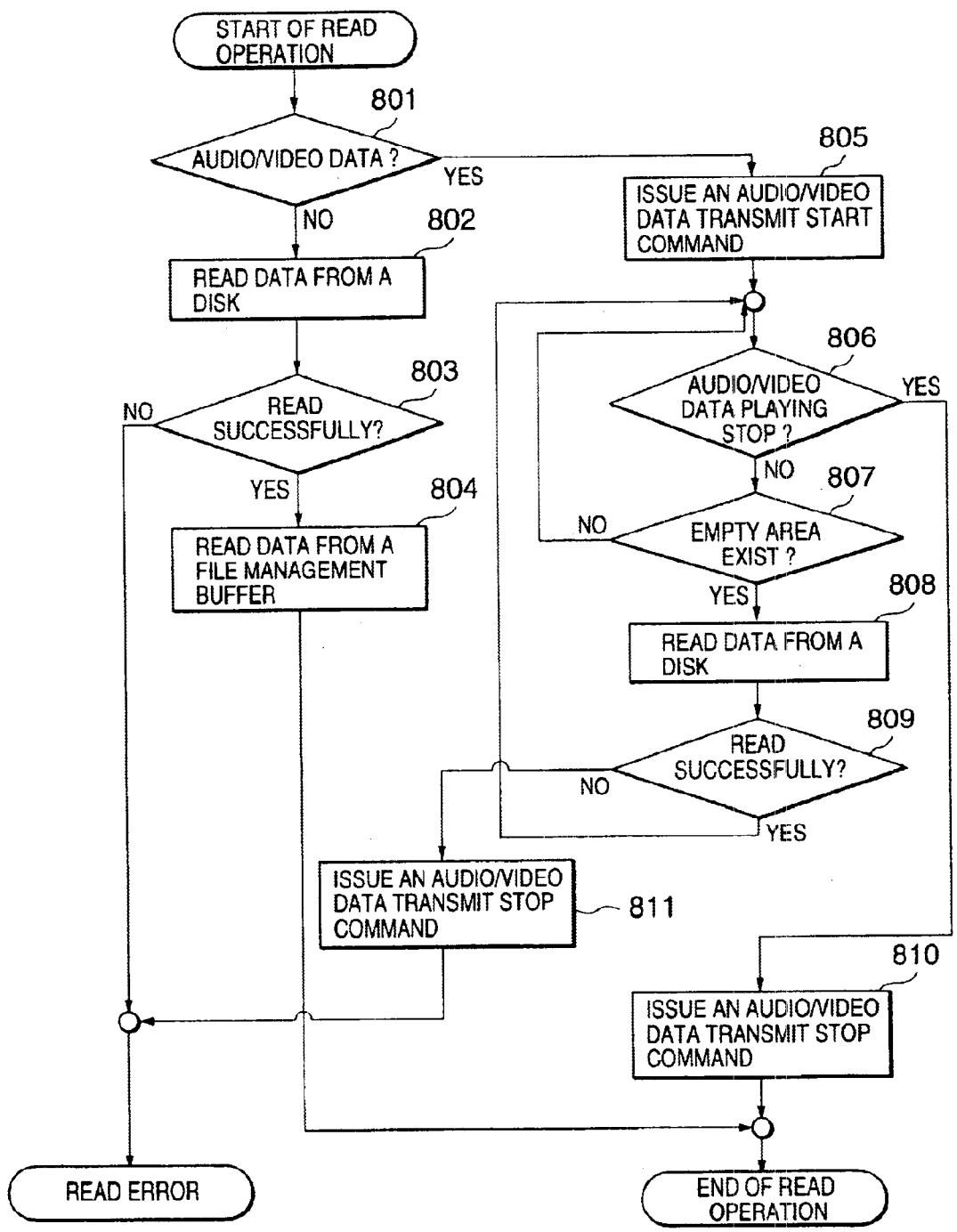
FIG. 9 shows a flowchart of file read operation of an embodiment of the invention.

Next, description is made about read operation of a file with reference to FIG. 9. The read operation is performed after mount operation of the file system.

At first, it is determined whether the data to be read is audio/video data or not (stop 801). This is determined based on an attribute which is given from a host application when read operation is started. The attribute is kept in the form of stream bit included in an attribute of a file entry.

In an example of a file entry format shown in FIG. 11, when the stream bit in the attribute is designated with a value, the file is determined as including audio/video data, otherwise the file is determined as including data other than the audio/video data. Also, even if the method of the embodiment of the invention can apply to a file system which has no such an attribute about file structure, it is possible to determine whether the file includes audio/video data or not on the basis of the other characteristic such as a file name.

When the file does not include audio/video data (step 801 (no)), the file system instructs to read the data from the optical disk by issuing a read command (step 802). Thus, read data are decoded or copied to the file management buffer area in the buffer memory 20 (step 802). Then, the system determines whether the read operation is performed successfully or not (step 803), and if successfully performed (step 803(yes)), the data stored in the file management buffer are read (step 804) and the read operation is completed. It the read operation is failed (step 803(no)), the read operation is suspended due to an error.

If it is determined that the received data are audio/video data (step 801(yes)), the file System issues an audio/video data transmission start command (step 805). The control CPU 16 of the interface device 10 which receives the audio/video data transmission start command instructs the memory controller 11 to make the DMA request signal (DREQ) active. The file system checks whether an audio/video recording stop instruction is issued or not (step 806). If the file system receives the audio/video recording stop instruction, the system issues an audio/video data transmission stop command (step 810) and the write operation is completed.

If the file system does not receive the audio/video recording stop instruction, the system inquires an amount of the data from the interface device 10, and polling is performed until an amount of empty areas of the buffer exceeds a predetermined amount (step 807). When there are empty areas of the buffer, read operation of the disk is performed (step 808) and a result of the read operation is determined (step 809).

If the read operation is performed successfully (step 809(yes)), steps on and after step 806 are repeated. On the other hand, if the read operation is failed (step 809 (no)), the system issues an audio/video data transmission stop command (step 811) and the read operation is suspended due to an error.

In the above mentioned control of the interface device 10, it is possible to perform flow control for every GOP (Group Of Pictures) of audio/video data stream data by adding the following control to the device 10, when a transmission rate of an audio/video data stream supplied from the AV MUX/DEMUX 70 is decreased temporarily due to an error such as a write error. Herein the GOP means a unit of audio/video data which are composed of audio data and/or video data including a plurality of images in a data encode format of MPEG method and is used to perform trick play (for example, rewinding (jump to a marked location in an audio/video data stream and play the audio/video from the location)) of audio/video data.

Figure 15:
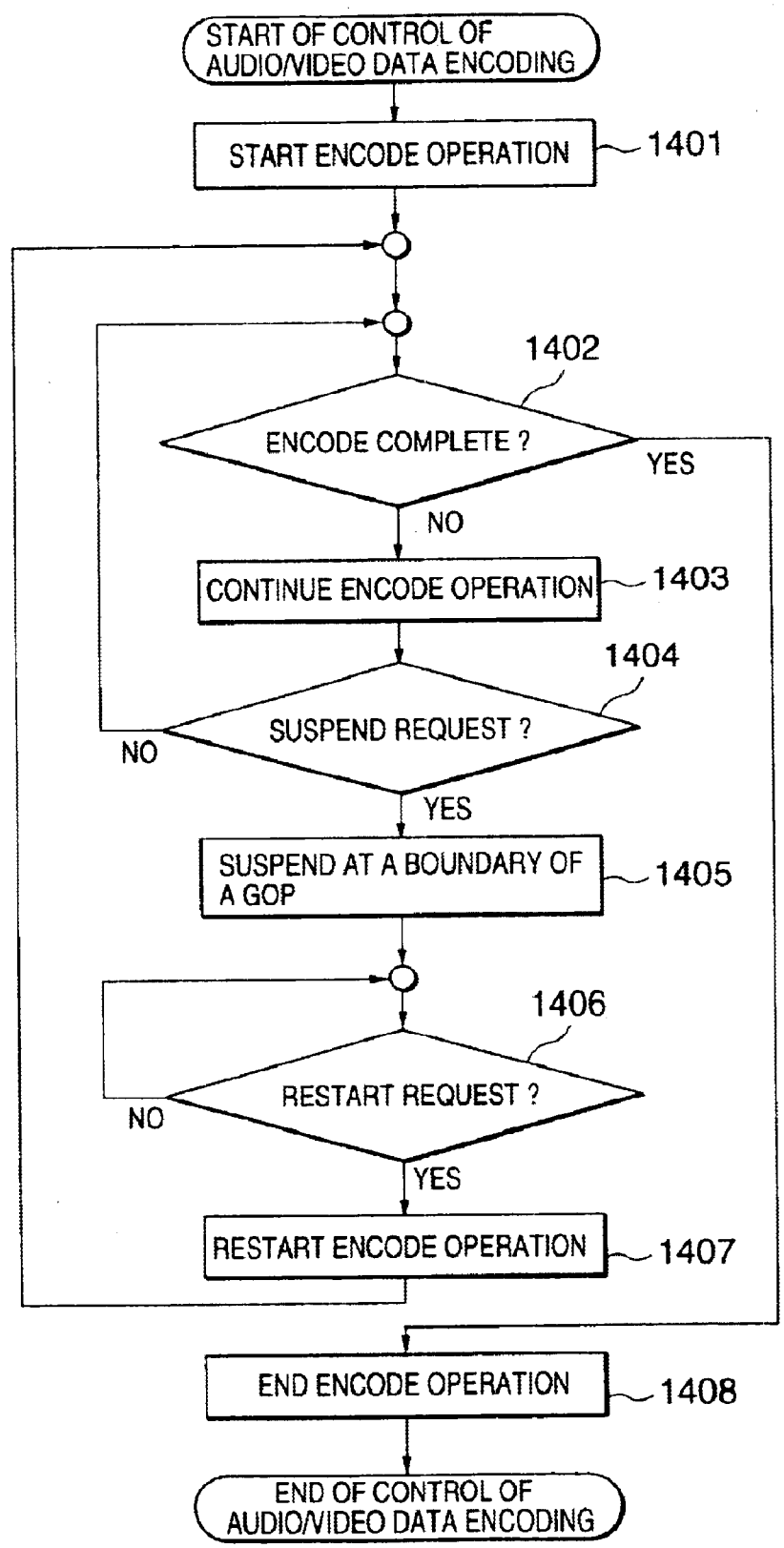
FIG. 15 shows a flowchart of pause operation of the invention when an error occurs in write operation.
Figure 16:
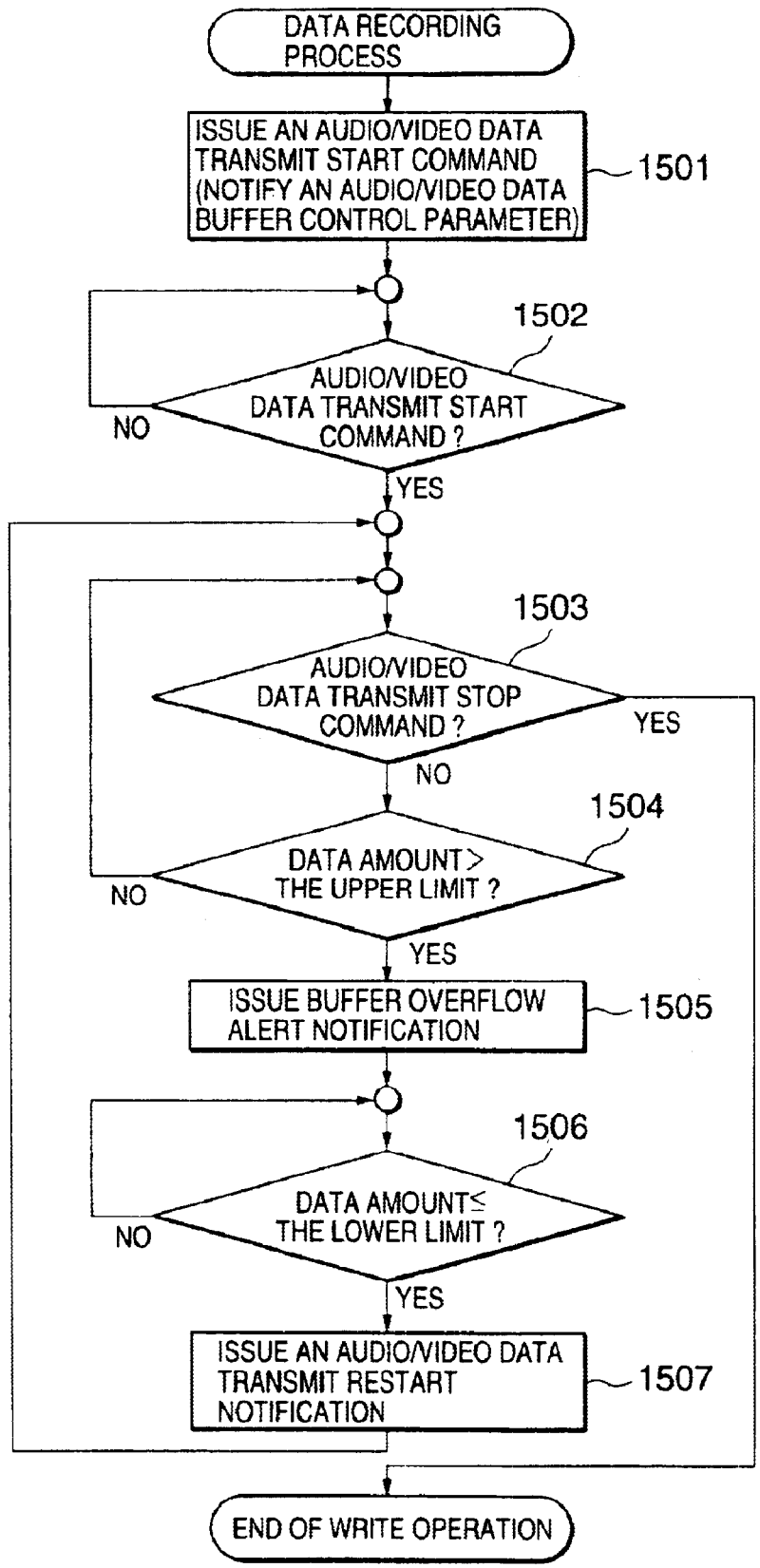
FIG. 16 shows a flowchart representing flow control of pause operation of the invention when an error occurs in write operation.

Next, description is made about operation when a error occurs in write operation and flow control of the AV MUX/DEMUX 70 with reference to FIGS. 15 and 16.

An algorithm of process which is executed in the interface device 10 can be implemented either in a hardware like manner by using the memory controller 11 or in a software like manner by using the control CPU 16.

From the CPU 80, as required, the upper limit and the lower limit of threshold value are notified as buffer control parameter to control a buffer control (step 1501 in FIG. 16). When the audio/video data transmission start command is received (step 1502 in FIG. 16), the following steps (1503 to 1507) are repeated until the audio/video data transmission stop command is received (step 1503 in FIG. 16). While the steps are repeated, the CPU 80 notifies the AV MUX/DEMUX 70 of start of audio/video data encoding (step 1401 in FIG. 15). The CPU 80 repeats encoding operation (steps 1402 and 1403) until instruction to atop audio/video data encoding is received.

The interface device 10 always determines whether the an amount of data exceeds the upper limit of the threshold value (step 1504 in FIG. 16). If the amount of the data exceeds, the device 10 notifies the host CPU 80 of buffer overflow alert by issuing an interrupt signal INT (step 1505 in FIG. 16). But, storing of the data is continued. Otherwise, the device 10 continues waiting for the audio/video data transmission stop command (step 1503 in FIG. 16).

When the CPU 80 receives the buffer overflow alert (step 1404 in FIG. 15), the CPU go controls the AV MUX/DEMUX 70 to suspend process at a boundary of a GOP (step 1405 in FIG. 15). Thereby, output from the AV MUX/DEMUX 70 is stopped and the data which are controlled by the buffer memory 20 are reduced since write operation of steps 710 to 713 shown in FIG. 6 is continued.

When the amount of the data is equal to or less than the lower limit of the threshold (step 1506 in FIG. 16), the interface device 10 notifies the CPU 80 of restart of audio/video data transmission by issuing an interrupt signal INT (step 1507 in FIG. 16).

The CPU 80 which receives the restart of audio/video data transmission records the audio/video data from the boundary of the GOP by restarting output of the AV MUX/DEMUX 70 (steps 1406 and 1407 in FIG. 15).

As described above, flow control can be performed at a boundary of a GOP by threshold control function of the memory controller.

Description has thus far been made by illustrating a preferred embodiment of the invention, but the scope of the invention is not limited to the embodiment. For example, in the concrete specification, illustration is made about audio/video data . However, the method and system of the invention is especially effective to data which have a large amount and are provided in real time, such as audio/video data, therefore, the method and system can be applied in writing or reading another type of data.

Also, in the illustrated embodiment, the optical disk is used as a recording media of data. But, a magnetic disk such as a hard disk, or a tape media can be also used.

As described above, according to the data storage device and the interface device of the invention, it is no need to indicate data transmission timing from the outside since a DMA request signal (DREQ) and a DMA acknowledgement signal (DACK) bears timing information. Thereby, output of an encoder can be directly supplied to the interface device without temporarily storing the output data to a large amount of buffer memory, as a result, a cost about the interface device can be decreased.

Also, when data overflow occurs, it is not necessary to prepare a buffer memory by performing flow control at a boundary of GOP.

Further, according to the invention, it is possible to write data stored to a buffer memory which is under control of the interface device, and to a specific location on a disk by controlling of a file system executed on a CPU. Also, even if an error occurs in write operation, instruction to restart or write to another location can be issued. Therefore, theta is an advantage that a general-purpose area management software can be used as a file system.

What is claimed is:

1. A data storage device comprising:
   a read/write device which writes data to a data storage media and reads the data from the data storage media;
   an interface device which controls the read/write device for data input/output; and
   a buffer memory which is controlled by the interface device, wherein the interface device comprises:
   a memory control device which activates a request signal for requesting transmission of the data, receives the data on a data bus when the request signal is activated and an acknowledgement signal responds to the request signal, stores the data in the buffer memory, and reads the data from the buffer memory and transmits the data to the read/write device; and
   an operation control device which receives an instruction command from outside, and instructs the memory control device to activate or inactivate the request signal and instructs the memory control device to transmit the data to the read/write device in response to the instruction command,
   wherein the interface device receives a data signal directly from an avmux/demux circuit.

2. A data storage device comprising:
   a read/write device which writes data to a data storage media and reads the data from the data storage media;
   an interface device which controls the read/write device for data input/output: and
   a buffer memory which is controlled by the interface device, wherein the interface device comprises:
      a memory control device which activates a request signal for requesting transmission of the data, receives the data on a data bus when the request signal is activated and an acknowledgement signal responds to the request signal, stores the data in the buffer memory, and reads the data from the buffer memory and transmits the data to the read/write device; and
      an operation control device which receives an instruction command from outside, and instructs the memory control device to activate or inactivate the request signal and instructs the memory control device to transmit the data to the read/write device in response to the instruction command,
   wherein the operation control device monitors data write operation of the read/write device to the data storage media, and instructs to write the data into another area and instructs the memory control device not to delete the data from the buffer memory when a write error occurs and wherein the memory control device keeps the data in the buffer memory until the data write operation of the read/write device to the data storage media is successfully completed according to the instruction from the operation control device.

3. A data storage device comprising:
   a read/write device which writes data to a data storage media and reads the data from the data storage media;
   an interface device which controls the read/write device for data input/output; and a buffer memory which is controlled by the interface device, wherein the interface device comprises:
   a memory control device which activates a request signal for requesting transmission of the data, receives the data on a data bus when the request signal is activated and an acknowledgement signal responds to the request signal, stores the data in the buffer memory, and reads the data from the buffer memory and transmits the data to the read/write device; and an operation control device which receives an instruction command from outside, and instructs the memory control device to activate or inactivate the request signal and instructs the memory control device to transmit the data to the read/write device in response to the instruction command,
   wherein the operation control device designates the upper limit and the lower limit of an amount of the data stored in the buffer memory, sends a request to stop transmitting the data to a providing source of the data when the amount of the data exceeds the upper limit, and sends a request to restart transmitting the data to the providing source of the data when the amount of the data becomes below the upper limit.

4. The data storage device of claim 3, wherein the operation control device designates the upper limit and the lower limit of a threshold value of an amount of the data stored in the buffer memory.

5. An interface device which controls input/output of data to a read/write device reading or writing data to a data storage media, the interface device comprising:
   a memory control device which activates a request signal which requests to transmit the data, receives the data on a data bus when the request signal is activated and an acknowledgement signal responds to the request signal, stores the data in the buffer memory, and reads the data from the buffer memory and transmits the data to the read/write device; and
   an operation control device which receives an instruction command from outside the interface device, and instructs the memory control device to activate or inactivate the request signal and instructs the memory control device to transmit the data to the read/write device in response to the instruction command,
   wherein the interface device receives a data signal directly from an avmux/demux circuit.

6. An interface device which controls input/output of data to a read/write device reading or writing data to a data storage media, the interface device comprising:
   a memory control device which activates a request signal which requests to transmit the data, receives the data on a data bus when the request signal is activated and an acknowledgement signal responds to the request signal, stores the data in the buffer memory and reads the data from the buffer memory and transmits the data to the read/write device; and
   an operation control device which receives an instruction command from outside the interface device, and instructs the memory control device to activate or inactivate the request signal and instructs the memory control device to transmit the data to the read/write device in response to the instruction command,
   wherein the operation control device monitors data write operation of the read/write device to the data storage media, and instructs to write the data into another area and instructs the memory control device not to delete the data from the buffer memory when a write error occurs and wherein the memory control device keeps the data in the buffer memory until the data write operation of the read/write device to the data storage media is successfully completed according to the instruction instructed from the operation control device.

7. An interface device which controls input/output of data to a read/write device reading or writing data to a data storage media, the interface device comprising:

a memory control device which activates a request signal which requests to transmit the data, receives the data on a data bus when the request signal is activated and an acknowledgement signal responds to the request signal, stores the data in the buffer memory, and reads the data from the buffer memory and transmits the data to the read/write device; and an operation control device which receives an instruction command from outside the interface device, and instructs the memory control device to activate or inactivate the request signal and instructs the memory control device to transmit the data to the read/write device in response to the instruction command, wherein the operation control device designates the upper limit and the lower limit of an amount of the data stored in the buffer memory, sends a request to stop transmitting the data to a providing source of the data when the amount of the data exceeds the upper limit, and sends a request to restart transmitting the data to the providing source of the data when the amount of the data becomes below the upper limit.

8. The interface device of claim 7, wherein the operation control device designates the upper limit and the lower limit of a threshold value of an amount of the data stored in the buffer memory.

9. A method of storing data in a data storage device including a read/write device, which writes data to a data storage media and reads the data from the data storage media, the method comprising the steps of:

controlling the read/write device for data input/output;

controlling a buffer memory;

activating a request signal which requests to transmit the data;

receiving the data on a data bus when the request signal is activated and an acknowledgement signal is responded to the request signal;

storing the data to the buffer memory;

reading the data from the buffer memory and transmitting the data to the read/write device;

receiving an instruction command from outside; and instructing to activate or inactivate the request signal and instructing to transmit the data to the read/write device in response to the instruction command, wherein the data bus receives a data signal directly from an avmux/demux circuit.

10. A recording medium readable by a computer, tangibly embodying a program of instructions executable by the computer to perform a method of storing data in a data storage device including a read/write device which writes data to a data storage media and reads the data from the data storage media, the method comprising the steps of:

controlling the read/write device for data input/output;

controlling a buffer memory;

activating a request signal which requests to transmit the data;

receiving the data on a data bus when the request signal is activated and an acknowledgement signal is responded to the request signal; storing the data to the buffer memory;

reading the data from the buffer memory and transmitting the data to the read/write device;

receiving an instruction command from outside; and instructing to activate or inactivate the request signal and instructing to transmit the data to the read/write device in response to the instruction command, wherein the interface device receives a data signal directly from an avmux/demux circuit.

11. A method of successively storing first data including audio/video data and second data including code data except the audio/video data, into a data storage medium through an interface device, comprising the steps of:

distinguishing between the first and the second data in the interface device;

storing the first data in a first area of a buffer memory in a first manner; and storing the second data in a second area of the buffer memory different from the first area in a second manner different from the first manner, wherein the interface device receives at least one of the first and second data directly from an avmux/demux circuit.

12. A method of successively storing first data including audio/video data and second data including code data except the audio/video data, into a data storage medium through an interface device, comprising the steps of:

distinguishing between the first and the second data in the interface device;

storing the first data in a first area of a buffer memory in a first manner; and storing the second data in a second area of the buffer memory different from the first area in a second manner different from the first manner, wherein the first manner is a first-in first-out manner while the second manner is different from the first-in first-out manner.

* * * * *